United States Patent
Kondo et al.

(10) Patent No.: US 10,690,480 B2
(45) Date of Patent: Jun. 23, 2020

(54) FILM THICKNESS MEASURING METHOD AND FILM THICKNESS MEASURING DEVICE

(71) Applicant: TOYOTA JIDOSHA KABUSHIKI KAISHA, Toyota-shi, Aichi-ken (JP)

(72) Inventors: Koji Kondo, Chiba (JP); Naoto Okada, Tokyo (JP); Hirokatsu Aramaki, Okazaki (JP); Katsuya Iwamoto, Nogoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 50 days.

(21) Appl. No.: 16/030,898

(22) Filed: Jul. 10, 2018

(65) Prior Publication Data
US 2019/0017807 A1   Jan. 17, 2019

(30) Foreign Application Priority Data
Jul. 13, 2017   (JP) .................................. 2017-136898

(51) Int. Cl.
*G01B 11/06* (2006.01)
*B24B 37/013* (2012.01)

(52) U.S. Cl.
CPC ............ *G01B 11/06* (2013.01); *B24B 37/013* (2013.01); *G01B 11/0625* (2013.01); *G01B 11/0683* (2013.01)

(58) Field of Classification Search
CPC . G01B 11/06; G01B 11/0625; G01B 11/0683; G01B 11/0608; G01B 11/02;
(Continued)

(56) References Cited

U.S. PATENT DOCUMENTS 3,869,211 A * 3/1975 Watanabe .......... G01B 11/0683
356/632
4,531,838 A * 7/1985 Sawamura .............. C23C 14/54
356/504
(Continued)

FOREIGN PATENT DOCUMENTS

CN    102341670 A    2/2012
CN    103003661 A    3/2013
(Continued)

OTHER PUBLICATIONS

Hu, H., et al., "Evaporation of a Sessile Droplet on a Substrate", Journal of Physical Chemistry, Part B, 2002, vol. 106, No. 6, pp. 1334-1344.

*Primary Examiner* — Mohmaed K Amara
(74) *Attorney, Agent, or Firm* — Sughrue Mion, PLLC (57) ABSTRACT

A signal waveform of an estimation signal and a signal waveform of the reflected light intensity signal are coordinated with each other such that a time point when a film thickness is equal to zero in the signal waveform of the estimation signal and a base point in the signal waveform of the reflected light intensity signal coincide with each other. A film thickness corresponding to that estimated value of a signal intensity of a reflected light which corresponds to a film thickness range corresponding to a time range in the signal waveform of the estimation signal and coincides with the signal intensity of the reflected light at a desired time point is set as a film thickness of a thin film at the desired time point.

5 Claims, 7 Drawing Sheets

(58) Field of Classification Search
CPC ...... G01B 7/105; G01B 11/306; G01B 11/22; G01B 15/02; G01B 17/02; G01B 7/10; G01B 5/06; G01B 7/08; G01B 7/345; B24B 37/013; G01N 21/8422; G01N 2223/61; G01N 33/26; G01N 15/0631; G01N 33/28
See application file for complete search history.

(56) References Cited

U.S. PATENT DOCUMENTS

| | | | |
|---|---|---|---|
| 4,998,021 | A | 3/1991 | Mimasaka |
| 5,292,605 | A | 3/1994 | Thomson |
| 5,427,878 | A | 6/1995 | Corliss |
| 5,862,199 | A * | 1/1999 | MacKenzie ............ B64D 15/20 378/89 |
| 6,252,930 | B1 * | 6/2001 | MacKenzie ........... B05B 12/084 378/89 |
| 6,903,340 | B1 | 6/2005 | Scaiano et al. |
| 7,339,382 | B1 * | 3/2008 | Bray ...................... G01B 15/02 324/637 |
| 8,388,408 | B2 * | 3/2013 | Kobayashi ............. B24B 49/12 451/5 |
| 8,581,602 | B2 * | 11/2013 | Bray ...................... G01B 15/02 324/642 |
| 9,757,027 | B2 * | 9/2017 | Arieli ................. G01B 9/02025 |
| 2005/0237537 | A1 | 10/2005 | Leizerson et al. |
| 2007/0121124 | A1 * | 5/2007 | Nabatova-Gabain ....................... G01B 11/0641 356/630 |
| 2007/0248751 | A1 * | 10/2007 | Ling ..................... C23C 14/042 427/248.1 |
| 2011/0299097 | A1 | 12/2011 | Ohtsuka et al. |
| 2011/0299098 | A1 * | 12/2011 | Furuya ............... G01B 11/0616 356/632 |
| 2017/0176331 | A1 * | 6/2017 | Ryo .................. H01L 21/67253 |
| 2018/0038681 | A1 * | 2/2018 | Van Mechelen ... G01B 11/0633 |
| 2018/0119359 | A1 * | 5/2018 | Gorden ................. D21H 19/74 |
| 2019/0183333 | A1 * | 6/2019 | Arieli .................... G01J 3/0248 |

FOREIGN PATENT DOCUMENTS

| | | |
|---|---|---|
| JP | 2000-314612 A | 11/2000 |
| JP | 2002-277215 A | 9/2002 |
| JP | 2012-189406 A | 10/2012 |
| WO | 2012/115643 A1 | 8/2012 |

* cited by examiner

FILM THICKNESS MEASURING METHOD AND FILM THICKNESS MEASURING DEVICE

INCORPORATION BY REFERENCE

The disclosure of Japanese Patent Application No. 2017-136898 filed on Jul. 13, 2017 including the specification, drawings and abstract is incorporated herein by reference in its entirety.

BACKGROUND

1. Technical Field

The disclosure relates to a film thickness measuring method and a film thickness measuring device.

2. Description of Related Art

As methods of measuring a film thickness of a film present on a substrate, a method of calculating the film thickness according to an optical interference method through the use of a spectroscope (e.g., see Japanese Patent Application Publication No. 2000-314612 (JP 2000-314612 A) and Japanese Patent Application Publication No. 2012-189406 (JP 2012-189406 A)), a method of calculating the film thickness by radiating light of a specific wavelength and measuring an intensity of the reflected light, a method of calculating the film thickness based on an intensity of white light by radiating the white light and measuring the intensity of the reflected light via a filter that allows only light of a specific wavelength to pass therethrough, and the like are proposed.

Besides, in the case where the film thickness is small, the change in intensity of light of a long wavelength is smaller than the change in film thickness. Therefore, there is also proposed a method of measuring the film thickness through the use of light of a short wavelength such as ultraviolet light or the like. Furthermore, in the case where the distribution of the film thickness in a two-dimensional region is measured, a method of creating two-dimensional data by moving a film thickness measuring instrument capable of carrying out a measurement point by point while maintaining a photographing angle formed with an illuminator, a method of scanning a spectroscope capable of extracting spectroscopic data on a linear region, and the like are also proposed.

SUMMARY

However, for example, in the case where the film thickness of a film made of a liquid present on a substrate is smaller than 100 nm, the fluctuation in spectroscopic reflectance of a visible light region is small, so the accuracy in measuring the film thickness may deteriorate. When a countermeasure such as the use of a spectroscope for an ultraviolet region or the like is taken to restrain this accuracy in measuring the film thickness from deteriorating, a device for measurement may become complicated or expensive.

Besides, in a method of measuring a change in intensity of reflected light resulting from interference by, for example, radiating light of a specific wavelength without using a spectroscope or fitting a light receiving element with a bandpass filter, a change in film thickness can be detected, but it cannot be identified whether the film thickness increases or decreases. Therefore, in order to make a conversion into the value of the film thickness, the film thickness that can be calculated needs to be confined within such a range that the film thickness and the reflection intensity uniformly change.

Furthermore, in a method of measuring a two-dimensional distribution by moving a spectroscopic interference film thickness measuring instrument that carries out measurement point by point, and a method of measuring a two-dimensional distribution by scanning a spectroscope capable of simultaneously extracting spectroscopic data on a linear region, there is a possibility of time constraint or the like in the case where, for example, the film thickness fluctuates within a short time, or the distribution of the film thickness at the same position is repeatedly measured. The disclosure provides a film thickness measuring method and a film thickness measuring device that can accurately detect a film thickness with a simple configuration even when the film thickness is relatively small.

According to one aspect of the disclosure, there is provided a film thickness measuring method. This film thickness measuring method includes: arranging a volatile light-permeable film to be measured on a substrate, and irradiating the light-permeable film with light from a light source until an end of evaporation of the light-permeable film; receiving reflected light of the light-permeable film in a regular reflection direction by a light receiving element, acquiring a reflected light intensity signal that is a time-series signal of a signal intensity of the reflected light until the end of evaporation of the light-permeable film, the reflected light intensity signal indicating a change of the signal intensity, and saving the acquired reflected light intensity signal into a storage device; estimating the signal intensity of the reflected light that is obtained by irradiating the light-permeable film with light from the light source, based on a spectroscopic intensity of the light source, a spectroscopic sensitivity of the light receiving element, and an optical constant of the light-permeable film, and acquiring an estimation signal indicating a change of an estimated value of the signal intensity of the reflected light as a film thickness of the light-permeable film changes; specifying a time range where a desired time point exists, based on the number of peaks in a signal waveform of the reflected light intensity signal from a base point as a time point of the end of evaporation of the light-permeable film to the desired time point; coordinating a signal waveform of the estimation signal and the signal waveform of the reflected light intensity signal with each other such that a time point when the film thickness is equal to zero in the signal waveform of the estimation signal and the base point in the signal waveform of the reflected light intensity signal coincide with each other, and specifying a film thickness range corresponding to the time range in the signal waveform of the estimation signal, based on the number of peaks in the signal waveform of the estimation signal; and acquiring a signal intensity of the reflected light at the desired time point, and setting a film thickness corresponding to that estimated value of the signal intensity of the reflected light which corresponds to a film thickness falling within the film thickness range and coincides with the signal intensity of the reflected light at the desired time point, as a film thickness of the light-permeable film at the desired time point.

Besides, according to another aspect of the disclosure, there is provided a film thickness measuring device. This film thickness measuring device is equipped with: a light source that is arranged on a substrate and that is configured to irradiate a volatile light-permeable film to be measured with light until an end of evaporation of the light-permeable film; a light receiving element that is configured to receive reflected light of the light-permeable film in a regular reflection direction; a storage device that is configured to store a reflected light intensity signal that is a time-series signal of a signal intensity of the reflected light output from the light receiving element until the end of evaporation of the light-permeable film, the reflected light intensity signal indicating a change of the signal intensity; an estimation signal acquisition unit that is configured to estimate the signal intensity of the reflected light that is obtained by irradiating the light-permeable film with light from the light source, based on a spectroscopic intensity of the light source, a spectroscopic sensitivity of the light receiving element, and an optical constant of the light-permeable film, and acquire an estimation signal indicating a change of an estimated value of the signal intensity of the reflected light as a film thickness of the light-permeable film changes; a time range specifying unit that is configured to specify a time range where a desired time point exists, based on the number of peaks in a signal waveform of the reflected light intensity signal from a base point as a time point of the end of evaporation of the light-permeable film to the desired time point; a film thickness range specifying unit that is configured to coordinate a signal waveform of the estimation signal and the signal waveform of the reflected light intensity signal with each other such that a time point when the film thickness is equal to zero in the signal waveform of the estimation signal and the base point in the signal waveform of the reflected light intensity signal coincide with each other, and specify a film thickness range corresponding to the time range in the signal waveform of the estimation signal, based on the number of peaks in the signal waveform of the estimation signal; and a film thickness setting unit that is configured to set a film thickness corresponding to that estimated value of the signal intensity of the reflected light which corresponds to a film thickness falling within the film thickness range and coincides with the signal intensity of the reflected light at the desired time point, as a film thickness of the light-permeable film at the desired time point.

Each of the aspects of the disclosure makes it possible to accurately detect the film thickness with a simple configuration even when the film thickness is relatively small.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The embodiment of the disclosure will be described hereinafter with reference to the drawings. Incidentally, in the following detailed description, a large number of specific and concrete configurations are described to provide the complete understanding of the embodiment of the disclosure. However, it is obvious that the disclosure is not limited to these specific and concrete configurations, and that other modes of carrying out the disclosure are possible. Besides, the following embodiment of the disclosure does not limit the disclosure set forth in the claims. Besides, it should not be concluded that all the combinations of the configurations described in the embodiment of the disclosure are indispensable as a means of solution provided by the disclosure.

In a film thickness measuring method according to the embodiment of the disclosure, a reflectance $R_f$ (f is either s denoting an s polarization component or p denoting a p polarization component) at the time when light is incident upon a light-permeable film of a refraction index n and a film thickness d that is on a substrate of a refraction index nm whose surface does not diffuse light from an incidence medium of a refraction index n0 at an angle θ0 is obtained, a relationship between the film thickness and the reflectance is calculated from a spectroscopic intensity of an illuminator with a narrowed-down wavelength range, which is used as a light source, and a spectroscopic sensitivity of a light receiving element as an actually measured value or a catalog specification determined by a maker, and the film thickness is obtained from the actually measured reflectance.

Figure 1:
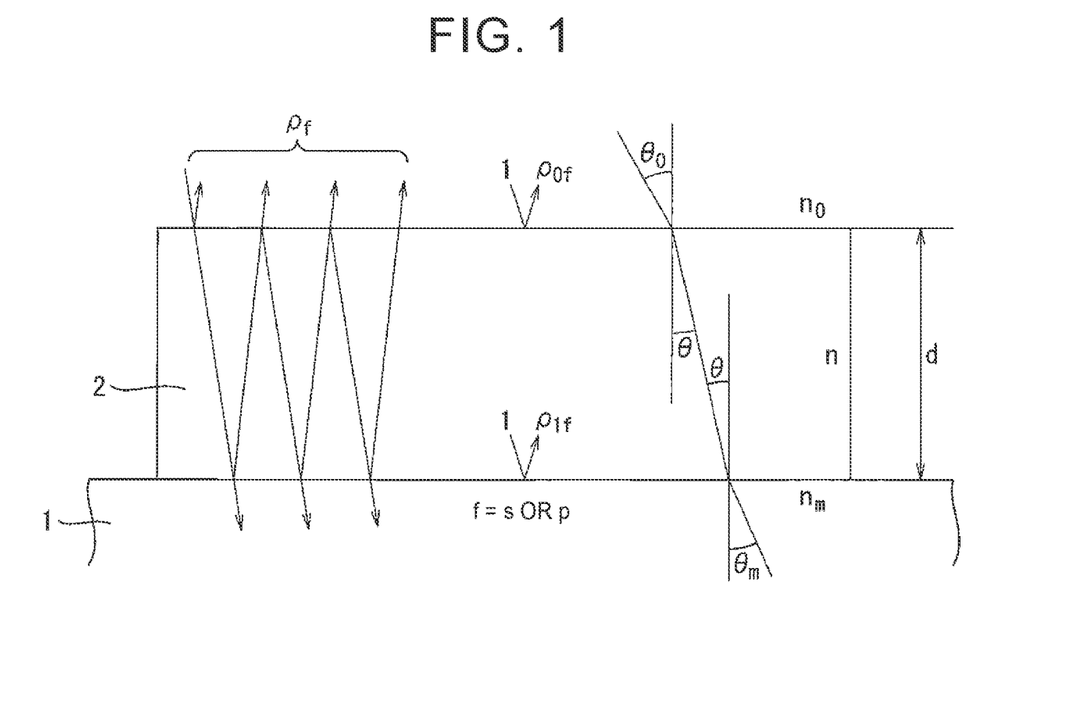
FIG. 1 is a view schematically showing an interference of reflected light of a thin film.

First of all, the interference of a thin film will be described. FIG. 1 is a schematic view showing the interference of the thin film. As shown in FIG. 1, when light is incident upon a thin film (a light-permeable film) 2 formed on a substrate 1 at the angle θ0, refraction indices of an incidence medium, the thin film 2 and the substrate 1 with respect to polarization components of the light, namely, s-waves and p-waves can be expressed according to the following equations (1) to (6). Incidentally, η0S denotes the refraction index of the incidence medium with respect to the s-waves as the polarization component, η0P denotes the refraction index of the incidence medium with respect to the p-waves as the polarization component, ηS denotes the refraction index of the thin film 2 with respect to the s-waves as the polarization component, ηP denotes the refraction index of the thin film 2 with respect to the p-waves as the polarization component, ηmS denotes the refraction index of the substrate 1 with respect to the s-waves as the polarization component, and ηmP denotes the refraction index of the substrate 1 with respect to the p-waves as the polarization component. Besides, θ denotes a refraction angle of light in the thin film 2, and θm denotes an output angle of light from the substrate 1.

$$\eta 0S = n0 \times \cos \theta 0 \tag{1}$$

$$\eta 0P = n0 / \cos \eta 0 \tag{2}$$

$$\eta S = n \times \cos \theta \tag{3}$$

$$\eta P = n/\cos\theta \quad (4)$$

$$\eta mS = nm \times \cos\theta m \quad (5)$$

$$\eta mP = nm/\cos\theta m \quad (6)$$

Besides, the Snell's law indicated by the following equation (7) is applicable between each of the refraction indices and an incidence angle, so equations (8) and (9) can be derived.

$$n0 \times \sin\theta 0 = n \times \sin\theta = nm \times \sin\theta m \quad (7)$$

$$\cos\theta = (1-\sin 2\theta)1/2 = \{1-(n0/nm)2 \times \sin 2\theta\}1/2 \quad (8)$$

$$\cos\theta m = (1-\sin 2\theta m)1/2 = \{1-(n0/nm)2 \times \sin 2\theta m\}1/2 \quad (9)$$

Besides, an optical film thickness of the thin film 2 can be expressed as n×d×cos θ. Therefore, when light passes through the thin film 2 once, a change in phase δ expressed according to the following equation (10) is produced.

$$\delta = (2\pi/\lambda) \times n \times d \times \cos\theta \quad (10)$$

Fresnel reflection coefficients on respective interfaces of the s-waves and p-waves as the polarization components of light can be expressed according to the following equations (11) to (14). Incidentally, ρ0S denotes the Fresnel reflection coefficient of the s-waves as the polarization component on a surface of the thin film 2, ρ1S denotes the Fresnel reflection coefficient of the s-waves as the polarization component on the interface between the thin film 2 and the substrate 1, ρ0P denotes the Fresnel reflection coefficient of the p-waves as the polarization component on the surface of the thin film 2, and ρ1P denotes the Fresnel reflection coefficient of the p-waves as the polarization component on the interface between the thin film 2 and the substrate 1.

$$\rho 0S = (\eta 0S - \eta S)/(\eta 0S + \eta S) \quad (11)$$

$$\rho 1S = (\eta S - \eta mS)/(\eta S + \eta mS) \quad (12)$$

$$\rho 0P = (\eta 0P - \eta P)/(\eta 0P + \eta P) \quad (13)$$

$$\rho 1P = (\eta P - \eta mP)/(\eta P + \eta mP) \quad (14)$$

An entire Fresnel coefficient ρf (f is either s or p) that takes multiple reflection into account is expressed according to the following equation (15), and the reflectance Rf (f is either s or p) is expressed according to the following equation (16).

$$\rho f = (\rho 0f + \rho 1f e - i2\delta)/(1 - \rho 0f \times \rho 1f e - i2\delta) \quad (15)$$

$$Rf = (\rho 0f2 + \rho 1f2 + 2\rho 0f \rho 1f \cos 2\delta)/\{1 + (\rho 0f \rho 1f)2 + 2\rho 0f \rho 1f \cos 2\delta\} \quad (16)$$

Figure 2:
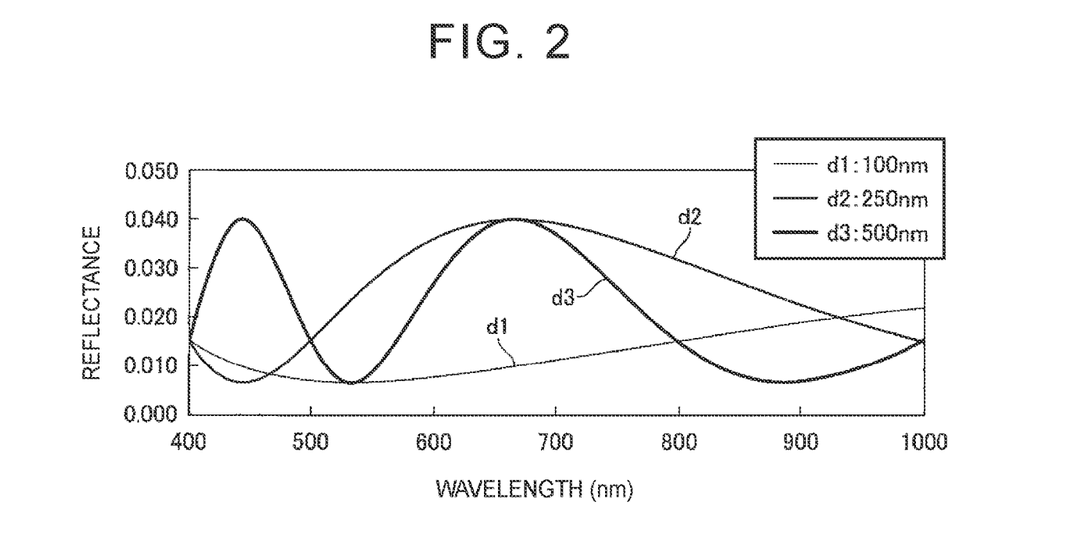
FIG. 2 shows an exemplary spectroscopic spectrum resulting from the interference shown in FIG. 1.

FIG. 2 shows a spectroscopic spectrum obtained from the equation (16). In FIG. 2, the axis of abscissa represents a wavelength, and the axis of ordinate represents a reflectance. Besides, d1 denotes characteristics in the case where the film thickness of the thin film 2 is equal to 100 nm, d2 denotes characteristics in the case where the film thickness of the thin film 2 is equal to 250 nm, and d3 denotes characteristics in the case where the film thickness of the thin film 2 is equal to 500 nm. A relationship between the film thickness of the thin film 2 and the reflectance as shown in FIG. 5 can be obtained from the spectroscopic spectrum shown in FIG. 2, a spectroscopic intensity I(λ) of the light source of the light incident upon the thin film 2 as shown in FIG. 3, and a spectroscopic sensitivity S(λ) of the light receiving element that photographs the light reflected by the thin film 2 as shown in FIG. 4.

Figure 3:
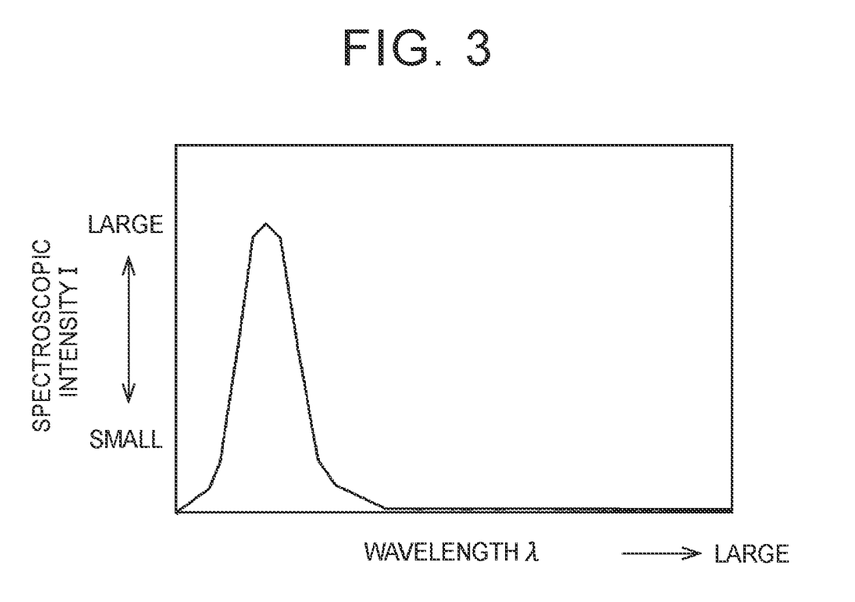
FIG. 3 is a characteristic diagram showing an exemplary spectroscopic intensity of a light source.
Figure 4:
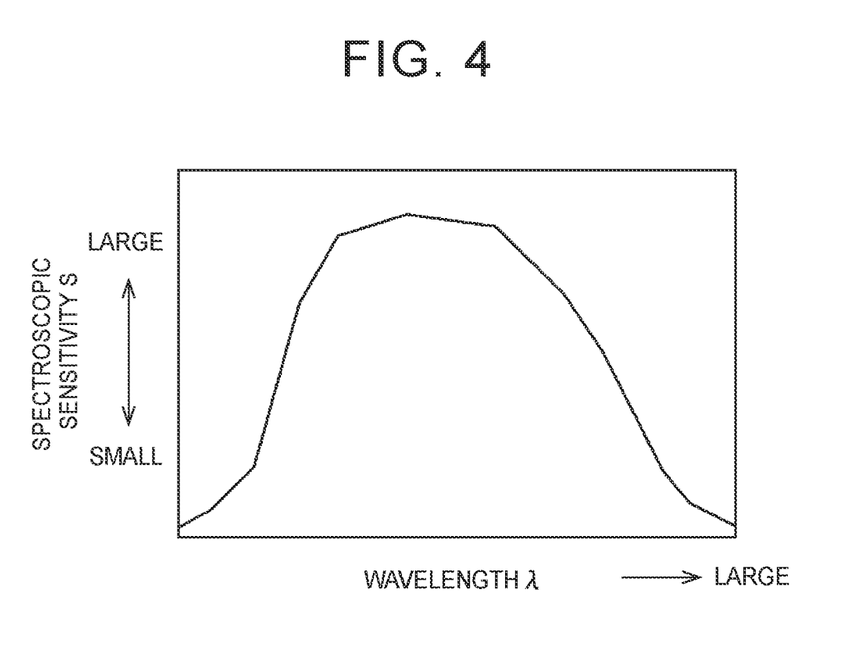
FIG. 4 is a characteristic diagram showing an exemplary spectroscopic sensitivity of a light receiving element.

Incidentally, in FIG. 3, the axis of abscissa represents the wavelength, and the axis of ordinate represents a spectroscopic intensity I of the light source. In FIG. 4, the axis of abscissa represents the wavelength, and the axis of ordinate represents a spectroscopic sensitivity S of the light receiving element. In FIG. 5, the axis of abscissa represents the film thickness, and the axis of ordinate represents the reflectance. The refraction index n of the thin film 2 is equal to 1.33, and the incidence angle θ0 of the light incident upon the thin film 2 is equal to 8°. Besides, characteristics λ1 indicate the reflectance in the case where the wavelength of the light incident upon the thin film 2 is equal to 450 nm, characteristics λ2 indicate the reflectance in the case where the wavelength of the light incident upon the thin film 2 is equal to 530 nm, and characteristics λ3 indicate the reflectance in the case where the wavelength of the light incident upon the thin film 2 is equal to 650 nm.

Figure 6:
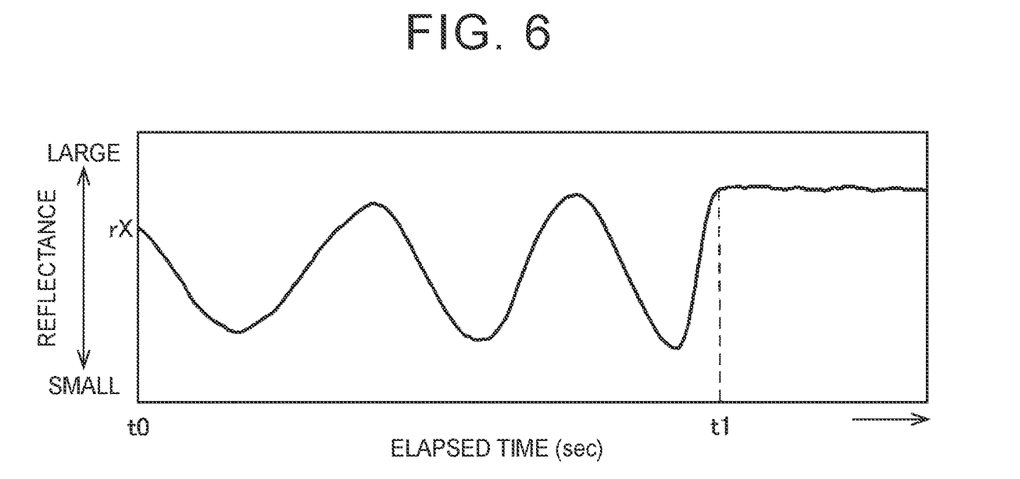
FIG. 6 shows an exemplary situation in which the reflectance fluctuates when the film thickness fluctuates through evaporation.

It should be noted herein that the film thickness decreases with the lapse of time when the thin film 2 is formed of an evaporable material, for example, water or the like. That is, when the reflectance of the thin film 2 in a process till the end of evaporation is measured, the reflectance increases or decreases as the film thickness fluctuates, as shown in FIG. 6. Then, the reflectance is maximized when evaporation of the thin film 2 ends, namely, when the film thickness of the thin film 2 is equal to zero. In FIG. 6, the axis of abscissa represents an elapsed time, and the axis of ordinate represents the reflectance. The film thickness monotonously decreases through evaporation with the lapse of time, and the reflectance oscillates as the film thickness fluctuates. Then, when the film thickness becomes equal to zero at a time point t1, the reflectance reaches a peak on a mountain side and thereafter remains equal to this peak value. The film thickness of the thin film 2 becomes equal to zero exactly when the reflectance starts remaining equal to the peak value.

Figure 5:
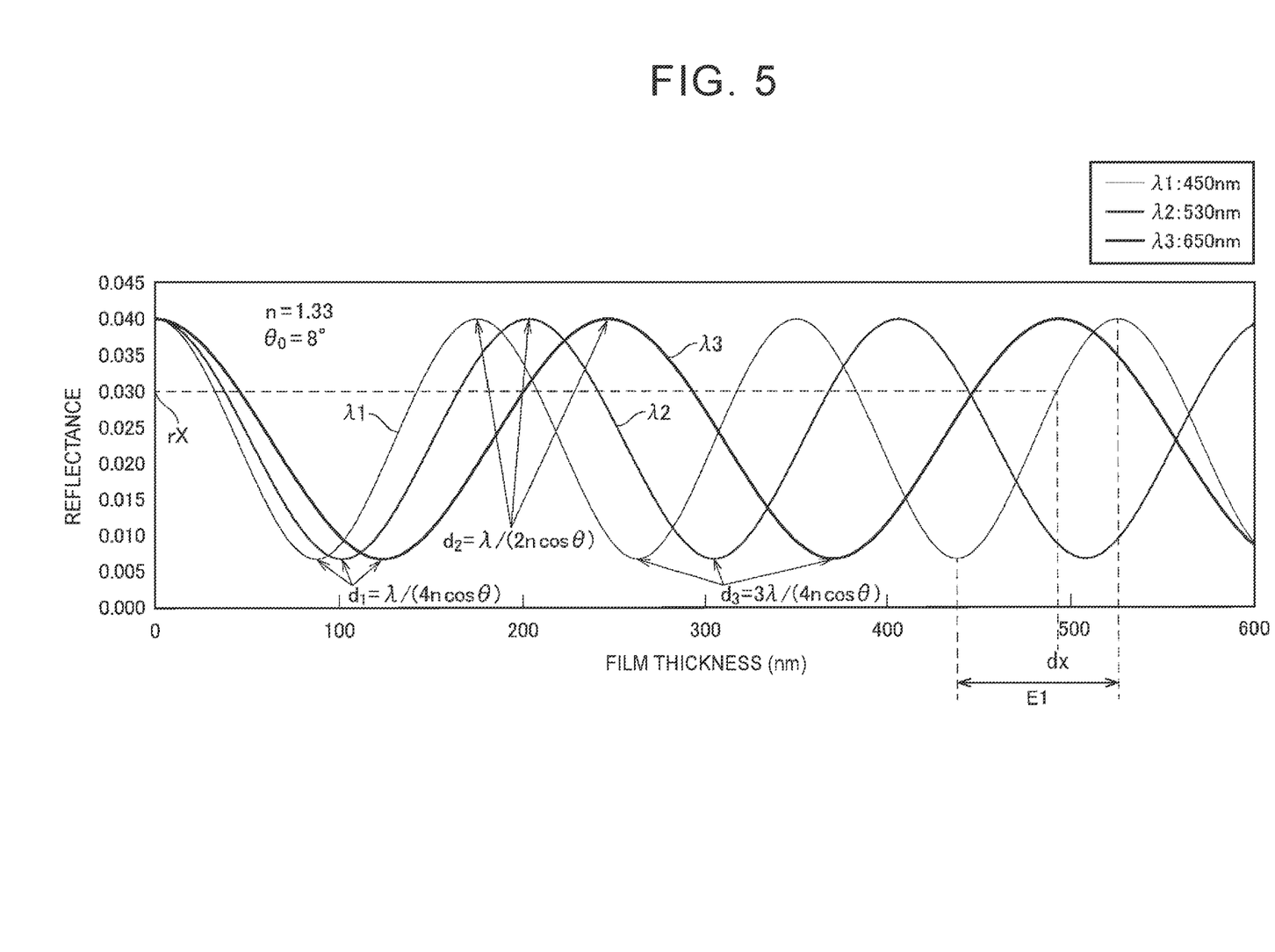
FIG. 5 is a characteristic diagram showing correspondence between a film thickness and a reflectance.

As shown in FIG. 5, the film thickness of the thin film 2 and the reflectance theoretically have such characteristics that the reflectance decreases with increases in the film thickness from zero and thereafter alternately increases and decreases. On the other hand, FIG. 6 shows an actually measured value of a change in the reflectance until the end of evaporation of the thin film 2. In FIG. 6, tracing back to a time point t0 from the time point t1 when the film thickness becomes equal to zero is equivalent to increases in the film thickness from zero, and the reflectance changes according to characteristics similar to those of FIG. 5 in accordance with the process of tracing back from the time point t1 when the film thickness becomes equal to zero (as the film thickness increases from zero). That is, with dX denoting the film thickness of the thin film 2 at the time point t0 and rX denoting the reflectance at the time point t0, a signal waveform indicating changes in the reflectance when tracing back to the time point t0 from the time point t1 in FIG. 6 is similar in shape to a signal waveform indicating changes in the reflectance from the time point when the film thickness becomes equal to zero to a time point when the film thickness becomes equal to dX in FIG. 5. That is, a position of the time point t0 on the signal waveform of the reflectance shown in FIG. 6 and a position of the film thickness dX on the signal waveform of the reflectance shown in FIG. 5 substantially coincide with each other. Accordingly, in the signal waveform of the reflectance shown in FIG. 5, the film thickness at a spot that coincides with the position of the time point t0 on the signal waveform of the reflectance shown in FIG. 6 can be regarded as the film thickness dX at the time point t0 on the signal waveform of the reflectance shown in FIG. 6. Incidentally, in the signal waveform of the reflectance shown in FIG. 5, in the case where the film thickness at the spot that coincides with the position of the time point t0 on the signal waveform of the reflectance shown in FIG. 6 cannot be obtained due to a calculation cycle or the like of the reflectance, it is appropriate, for example, to complement the signal waveform of the reflectance, obtain a signal waveform of the reflectance consisting of an analog signal, and acquire, from this signal waveform, the film thickness at the spot that coincides with the position of the time point t0. Alternatively, in a signal waveform of the reflectance consisting of a digital signal, a film thickness at a spot closest to the position of the time point t0 may be acquired.

In FIG. 6, when the time point t1, namely, the time point when the film thickness becomes equal to zero is considered to be a base point, the time point t0 is located between the fifth peak and the sixth peak (within a time range) in the process of tracing back peaks of the reflectance from the time point t1 in the sequence of valleys and mountains of the reflectance. If this is collated with a reference spot, that is, the spot where the film thickness is equal to zero in FIG. 5, the time range specified in FIG. 6 corresponds to a range between the fifth peak and the sixth peak (a film thickness range E1 in FIG. 5) which is obtained by proceeding along the peaks of the reflectance in the sequence of valleys and mountains thereof from the spot where the film thickness is equal to zero. In the film thickness range E1 of FIG. 5, the film thickness is equal to about 490 nm at a spot where the reflectance is equal to rX (e.g., about 0.030), so this film thickness coincides with the film thickness dX at the time point t0 in FIG. 6. That is, the film thickness dX of the thin film 2 at the time point t0 can be estimated from a situation of change in the reflectance until the film thickness of this thin film 2 becomes equal to zero.

Figure 7:
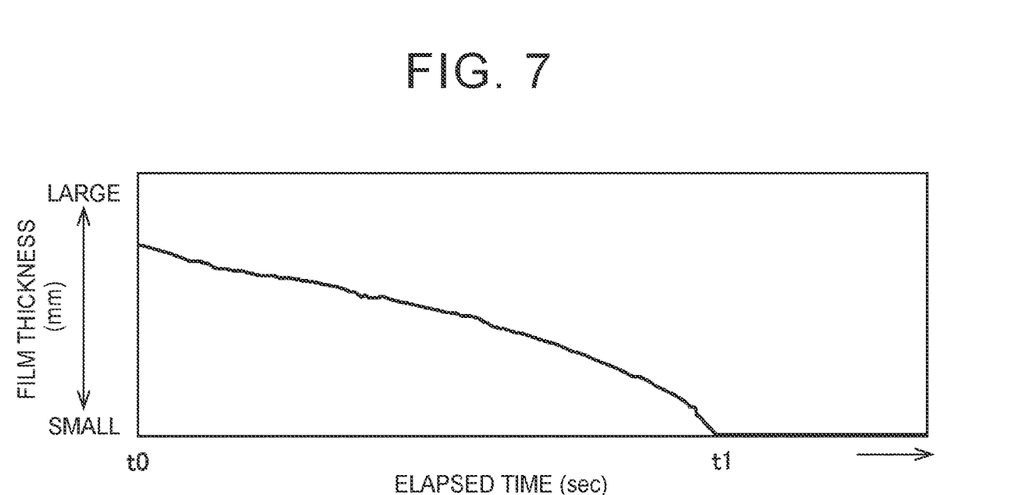
FIG. 7 shows an exemplary calculation result of the film thickness at the time when the film thickness fluctuates through evaporation.

FIG. 7 shows how the film thickness fluctuates in the case where the film thickness is calculated as the reflectance fluctuates as shown in FIG. 6, according to the aforementioned method. In FIG. 7, the axis of abscissa represents the elapsed time, and the axis of ordinate represents the film thickness. It has been confirmed that the film thickness of the thin film 2 decreases as the thin film 2 evaporates, and that the film thickness of the thin film 2 becomes equal to zero at the time point t1 when evaporation of the thin film 2 ends.

Figure 8:
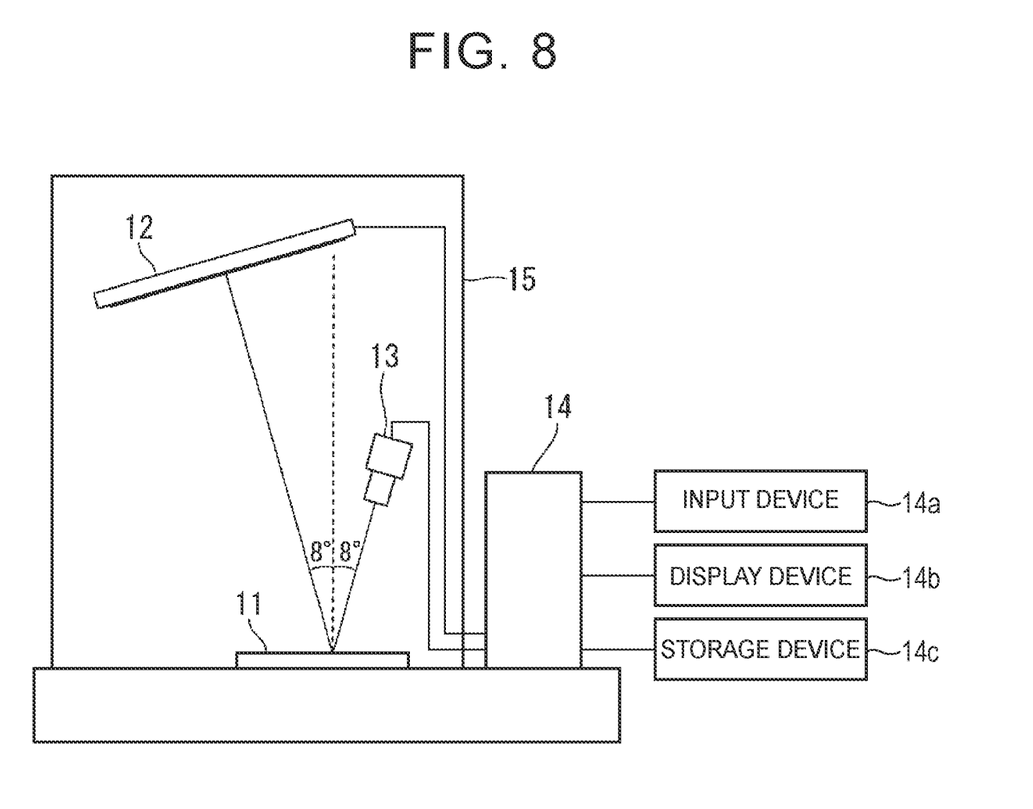
FIG. 8 is a general block diagram showing an exemplary film thickness measuring device according to the embodiment of the disclosure.

FIG. 8 is a schematic block diagram showing an exemplary film thickness measuring device that measures the film thickness through the use of the film thickness measuring method according to the embodiment of the disclosure.

The film thickness measuring device 10 is equipped with a light source 12, such as an LED display or the like, that planarly irradiates a surface of a glass 11 as a substrate on which the thin film 2 to be measured is formed with monochromatic light, an image capturing device 13 as a two-dimensional area sensor such as a black-and-white area camera or the like, and a controller 14. The light source 12 and the image capturing device 13 are arranged in such a manner as not to change their relative positions during measurement. Besides, the film thickness measuring device 10 is equipped with, for example, a blackout curtain 15 for blocking light to prevent the light other than that which is reflected by the light source 12 from being incident upon the image capturing device 13.

Incidentally, the thin film 2 may be a film exhibiting light permeability and volatility, such as a water film or the like. Besides, the glass 11 may not necessarily be applied as the substrate. The substrate may be any member having a specular reflecting surface such as a glass, mirror or resin or the like whose surface does not diffuse light, instead of a frosted glass or the like whose surface diffuses light. The light source 12 can include, within a field of vision thereof, an entire regular reflection region of a measurement region of the thin film 2 as viewed from the image capturing device 13, in accordance with the size of the measuring region.

The wavelength of the light source 12 may be set such that sufficient increasing/decreasing characteristics of the reflectance can be obtained as a reflected light intensity signal shown in FIG. 6. When the wavelength of the light source 12 is relatively long, it is difficult to acquire sufficient increasing/decreasing characteristics. The resolution capability improves and the quality of the acquired increasing/decreasing characteristics improves as the wavelength shortens. For example, a purple or blue LED light source or a laser light source can be applied as the light source 12. For example, a maximum intensity is found at a wavelength shorter than about 500 nm where the reflectance greatly changes when the film thickness of the thin film 2 becomes smaller than about 100 nm. By utilizing illumination by visible light rays with a narrow irradiation wavelength region, the accuracy in measuring the film thickness of the thin film 2 can be enhanced in the case where the film thickness is smaller than about 100 nm.

The image capturing device 13 is installed in a regular reflection direction (a specular reflection direction) of the light source 12 with respect to the surface of the glass 11. The controller 14 is equipped with an input device 14a, a display device 14b, and a storage device 14c. The controller 14 performs operation control of the light source 12 and the image capturing device 13, inputs thereto a captured image obtained by photographing reflected light produced through irradiation of the thin film 2 by the light source 12 through the use of the image capturing device 13, stores the captured image into the storage device 14c, and estimates the film thickness of the thin film 2 based on the captured image stored in the storage device 14c. Besides, an estimation signal indicating correspondence between the film thickness and the reflectance as shown in FIG. 5 is stored in the storage device 14c. This estimation signal is estimated in advance based on a spectroscopic spectrum obtained as to a model of the thin film 2 to be measured as shown in FIG. 2, spectroscopic intensity characteristics of the light source 12 as shown in FIG. 3, and spectroscopic sensitivity characteristics of the light receiving element of the image capturing device 13 as shown in FIG. 4 (function as an estimation signal acquisition unit).

Figure 9:
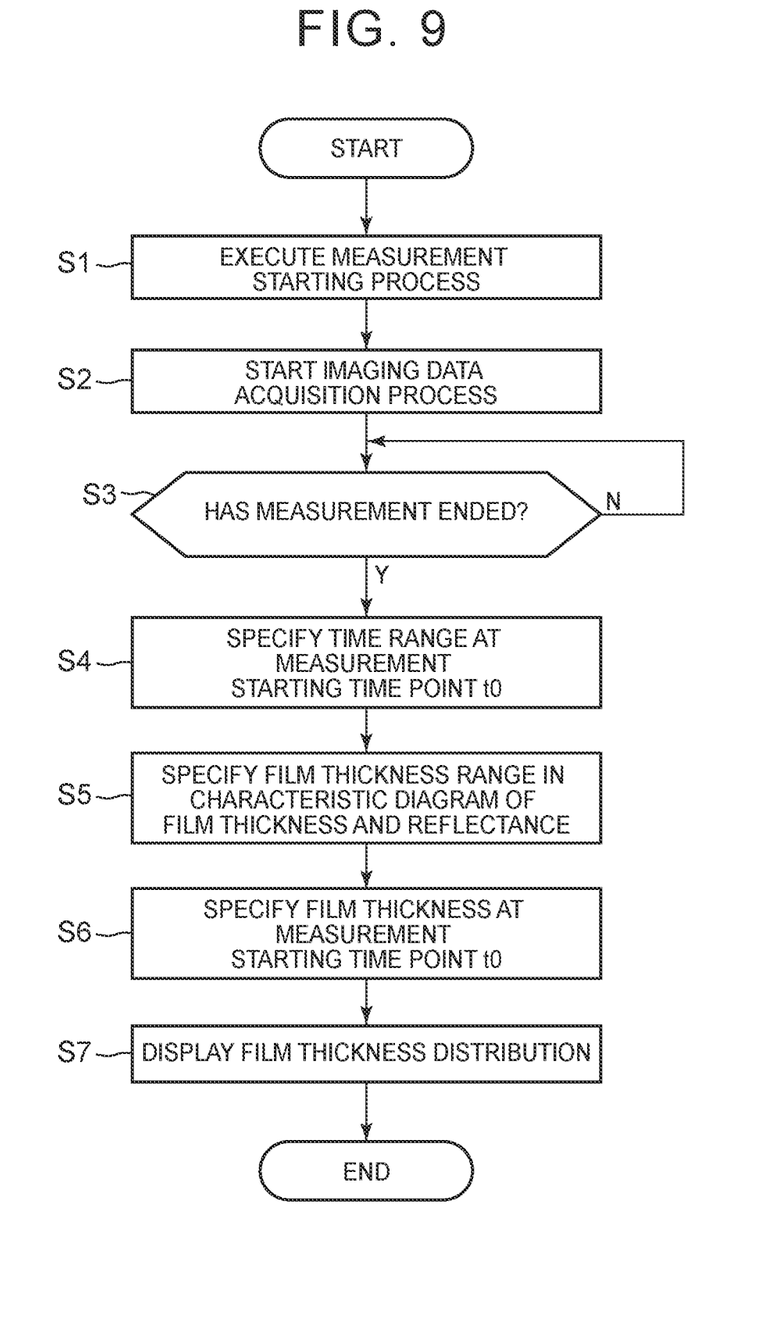
FIG. 9 is a flowchart showing an exemplary processing procedure of a controller.

Next, the operation of the disclosure will be described through the use of a flowchart showing an exemplary processing procedure of the controller 14 as shown in FIG. 9. An operator first commands the start of measurement of the film thickness by, for example, operating the input device 14a of the controller 14. When the start of measurement of the film thickness is commanded, the controller 14 drivingly controls the light source 12 and the image capturing device 13 (step S1), planarly irradiates a measurement target region of the thin film 2 with monochromatic light through the use of the light source 12, and photographs the entire regular reflection region of the measurement target region through the use of the image capturing device 13, for example, on a regular cycle.

The controller 14 sequentially reads captured image data photographed by the image capturing device 13, and starts a process of storing the captured image data thus read into the storage device 14c (step S2). After the image capturing device 13 starts capturing images and the controller 14 starts reading the captured image data, the operator creates the thin film 2 to be measured on the surface of the glass 11. Then, when the operator commands the end of measurement of the film thickness, for example, as soon as evaporation of the thin film 2 ends, the controller 14 stops driving the light source 12 and the image capturing device 13 (step S3).

Thus, a series of images including those of the surface of the glass 11 with the thin film 2 not formed thereon, the surface of the glass 11 with the thin film 2 formed thereon, the surface of the glass 11 from which the thin film is evaporating, and the surface of the glass 11 from which the thin film 2 has disappeared after the end of evaporation thereof are stored into the storage device 14c as captured image data. The controller 14 detects a reflected light intensity signal indicating how the reflectance changes with the lapse of time from the start of photographing as shown in FIG. 6, for each pixel, as to the captured image data stored in the storage device 14c, and specifies a position of presence of the time point t0 corresponding to the start of photographing on a signal waveform, namely, a time range with respect to the reflectance rX at the time point t0 and a time point when the film thickness becomes equal to zero or the time point t1 when the reflectance stops changing in FIG. 6 (function as a time range specifying unit) (step S4). In concrete terms, the controller 14 obtains the number of peaks corresponding to valleys and mountains on the signal waveform to the time point t0 with respect to the time point t1, and specifies a range between the last peak among the obtained number of peaks and a peak subsequent thereto, as the time range, with the time point t1 serving as a base point.

Subsequently, the controller 14 coordinates a characteristic curve indicating correspondence between the film thickness and the reflectance as shown in FIG. 5, which is stored in the storage device 14c, with the time range at the time point t0 as specified in step S4, and specifies the film thickness range E1 where the time point t0 on the signal waveform of the characteristic curve shown in FIG. 5 is estimated to be present (function as a film thickness range specifying unit) (step S5). Subsequently, the controller 14 detects a film thickness corresponding to the reflectance rX within the film thickness range E1, and specifies this film thickness as the film thickness dX at the time point t0 (function as a film thickness setting unit) (step S6).

Then, the controller 14 causes the display device 14b to display the film thickness of each pixel (step S7). For example, the controller 14 displays the film thickness of the measurement region of the thin film 2 by, for example, changing the displayed color in accordance with the film thickness, and ends the process. In this manner, the controller 14 detects a situation of change in the reflectance of the thin film 2 till the end of evaporation of the thin film 2, and detects the film thickness based on this situation of change and characteristics detected in advance as to the film thickness and the reflectance. Therefore, the film thickness can be easily detected with a simple configuration.

Besides, the film thickness can be obtained when the reflectance is known. Therefore, a change in the film thickness can be acquired on a high cycle by, for example, detecting the reflectance on a high cycle. Besides, the film thickness of the entire measurement target region can be obtained at the same time by photographing the entire measurement target region of the film thickness of the thin film 2. Therefore, the film thickness of the entire measurement target region at the same time point can be detected surface by surface.

Besides, the film thickness can be obtained when the reflectance can be detected. Therefore, the film thickness can be accurately detected even in the case where the film thickness is relatively small, for example, equal to or smaller than 100 nm or the like. Therefore, even a film thickness smaller than 50 nm, which is difficult to obtain through the method of detecting the film thickness through the use of the spectroscopic interference method according to the related art, can be detected. Therefore, a film that has a small film thickness and that evaporates in a short time, such as a water film or the like formed by a windshield wiper is favorably measured. Besides, in the aforementioned embodiment of the disclosure, the case where the LED display is used as the light source 12 capable of planar irradiation has been described, but the disclosure is not limited thereto. Planar irradiation may be carried out through the use of an LED planar irradiation device with a single wavelength or by irradiating an entire screen surface with LED light.

Besides, in the aforementioned embodiment of the disclosure, the case where the film thickness of the measurement region of the thin film 2 is detected surface by surface has been described, but the disclosure is not limited thereto. The film thickness of a single pixel on the thin film 2 can also be detected. Besides, in the aforementioned embodiment of the disclosure, the case where the same controller 14 carries out the process of collecting the situation of change in the reflectance of the thin film 2 to be measured and the process of calculating the film thickness has been described, but the disclosure is not limited thereto. The film thickness may be calculated by another processing device, based on the data representing the situation of change in the reflectance of the thin film 2 to be measured as stored in the storage device 14c.

Besides, in the aforementioned embodiment of the disclosure, the case where the substrate 1 has a flat surface has been described, but the disclosure is not limited thereto. The disclosure is also applicable to a case where the substrate 1 has a curved surface. In this case, it is appropriate to provide a screen that irradiates the entire measurement region of the surface of the substrate 1 as viewed from the image capturing device 13 with light from a light source or an illuminator entirely along the regular reflection direction. Besides, in the case where the substrate 1 does not have a flat surface, a true value of the film thickness may be detected by subjecting the value of the film thickness calculated on the assumption that the substrate 1 has a flat surface to correction calculation. This correction calculation may be carried out, for example, as follows.

This correction calculation is carried out based on the foregoing equation (10). An inclination from the flat surface of the substrate 1 is denoted by $\Delta\theta$ in the case where the substrate 1 has no flat surface. Besides, the true value of the film thickness obtained by performing correction calculation is denoted by d'. The change in phase $\delta$ in the case where the substrate 1 has a flat surface and the change in phase $\delta$ in the case where the substrate 1 has a curved surface are equal to each other, so the following equation (17) can be derived from the foregoing equation (10).

$$\delta = (2\pi/\lambda) \times n \times d' \times \cos(\theta + \Delta\theta) = (2\pi/\lambda) \times n \times d \times \cos\theta \quad (17)$$

The equation (17) can be expressed as the following equation (18) by being transformed.

$$d' = d \times \cos\theta / \cos(\theta + \Delta\theta) \quad (18)$$

That is, the film thickness d can be corrected through the use of the inclination $\Delta\theta$ of a measurement point, from the equation (18).

Besides, in the aforementioned embodiment of the disclosure, in the case where the thin film 2 is planarly irradiated, the incidence angle of the light incident from the light source 12 differs depending on the position in a target region of the film thickness. Therefore, for each irradiation position that is irradiated by the light source 12, the signal waveform of the reflectance shown in FIG. 5 may be calculated through the use of the incidence angle at the position. Besides, the film thickness of a liquid present between two objects can be measured through the use of the film thickness measuring method according to the embodiment of the disclosure.

The film thickness is equal to zero at a location where two objects are in contact with each other, for example, in the case where a sphere is in contact with a flat surface. A case where the size of an air gap increases due to an increase in distance between the two objects as the distance from the location where these two objects are in contact with each other increases is assumed. In view of the case where the liquid such as water or the like evaporates as described in the aforementioned embodiment of the disclosure, the state where the liquid has finished evaporating is equivalent to the state where the film thickness is equal to zero, namely, a contact position at which the two objects are in contact with each other. The change in film thickness caused as a result of evaporation of the liquid corresponds to the change in distance between the two objects, namely, the change in size of the air gap between the two objects that are out of contact with each other. For example, in the case where the sphere is in contact with the flat surface, the thickness of the air gap substantially uniformly increases as the distance from a contact point increases. When the film thickness measuring method according to the embodiment of the disclosure is applied to this air gap, the thickness of the air gap at each position can be measured. The phenomenon of the change in film thickness of the liquid present between the two objects can be explained by the reflectance (FIG. 10) and the film thickness (FIG. 11), which are obtained by replacing the axis of abscissa in FIGS. 6 and 7 mentioned earlier with an axis of abscissa representing, instead of the elapsed time, a spatial position from the position where the two objects are in contact with each other.

Figure 10:
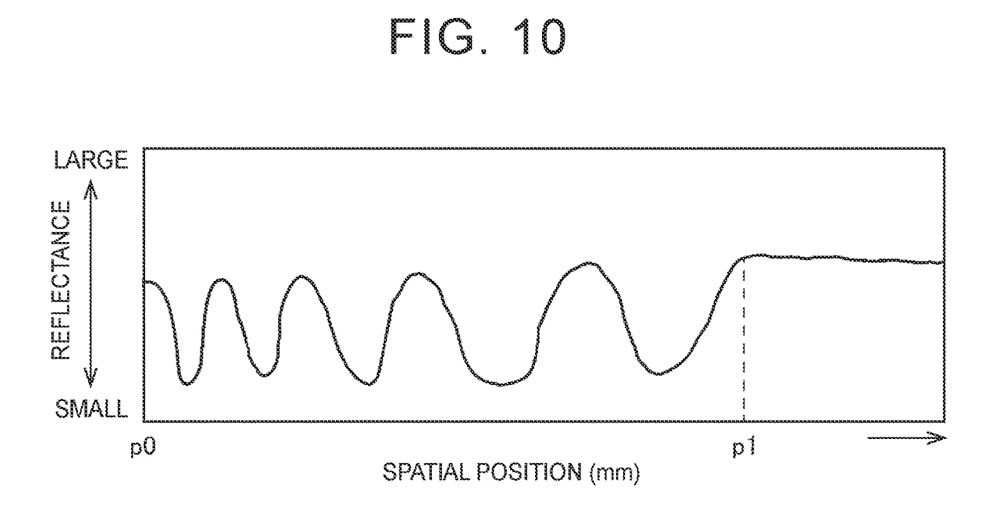
FIG. 10 shows an exemplary situation in which the reflectance of a liquid present between a flat surface and a sphere that is in contact with this flat surface fluctuates.
Figure 11:
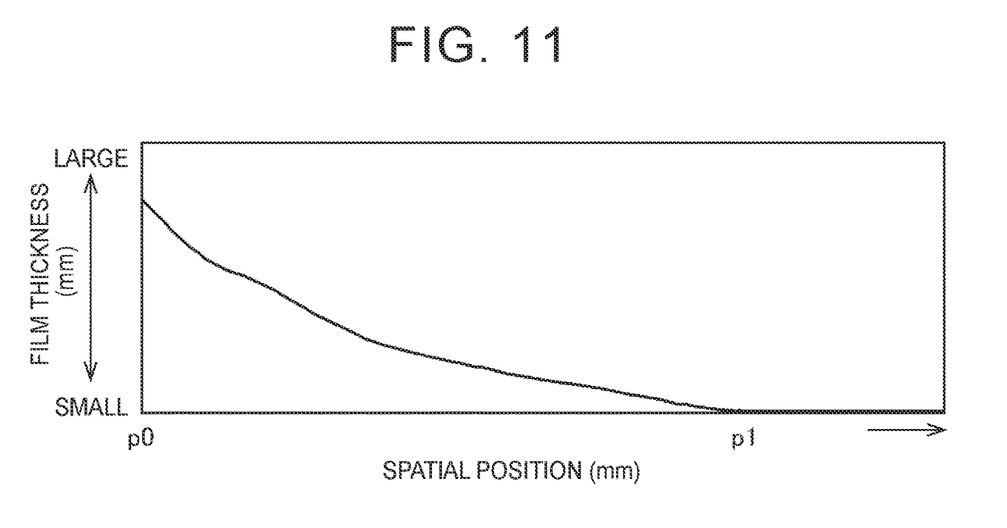
FIG. 11 shows an exemplary calculation result of the film thickness of the liquid present between the flat surface and the sphere that is in contact with this flat surface.

In FIGS. 10 and 11, p1 denotes a position where the two objects are in contact with each other with the film thickness equal to zero, and p0 denotes a distance from the position p1 where the film thickness is equal to zero. Incidentally, although the case where the film thickness of the liquid present between the two objects has been described herein, a clearance between a flat surface and a sphere that is in contact with the flat surface can also be measured according to a similar procedure. The scope of the disclosure is not limited to the exemplary embodiment thereof described and shown in the drawings, but the disclosure encompasses all the embodiments that bring about effects equivalent to the aim of the disclosure. Furthermore, the scope of the disclosure can be defined by every desired combination of all the specific configurational details disclosed herein.

What is claimed is:

1. A film thickness measuring method comprising
arranging a volatile light-permeable film to be measured on a substrate, and irradiating the volatile light-permeable film with light from a light source until an end of evaporation of the volatile light-permeable film;
receiving reflected light of the volatile light-permeable film in a regular reflection direction by a light receiving element, acquiring a reflected light intensity signal that is a time-series signal of a signal intensity of the reflected light until the end of evaporation of the volatile light-permeable film, the reflected light intensity signal indicating a change of the signal intensity, and saving the acquired reflected light intensity signal into a storage device;
estimating the signal intensity of the reflected light that is obtained by irradiating the volatile light-permeable film with light from the light source, based on a spectroscopic intensity of the light source, a spectroscopic sensitivity of the light receiving element, and an optical constant of the volatile light-permeable film, and acquiring an estimation signal indicating a change of an estimated value of the signal intensity of the reflected light as a film thickness of the volatile light-permeable film changes;
specifying a time range where a desired time point exists, based on a number of peaks, which correspond to valleys and mountains in a signal waveform of the reflected light intensity signal from a base point as a time point of the end of evaporation of the volatile light-permeable film to the desired time point;
coordinating a signal waveform of the estimation signal and the signal waveform of the reflected light intensity signal with each other such that a time point when the film thickness is equal to zero in, the signal waveform of the estimation signal and the base point in the signal waveform of the reflected light intensity signal coincide with each other, and specifying a film thickness range corresponding to the time range in the signal waveform of the estimation signal, based on the number of peaks in the signal waveform of the estimation signal; and
acquiring a signal intensity of the reflected light at the desired time point, and setting a film thickness corresponding to that estimated value of the signal intensity of the reflected light which corresponds to a film thickness falling within the film thickness range and coincides with the signal intensity of the reflected light at the desired time point, as a film thickness of the light-permeable film at the desired time point.

2. The film thickness measuring method according to claim 1, wherein
a plurality of light receiving elements are provided to constitute a two-dimensional area sensor.

3. The film thickness measuring method according to claim 2, wherein
the light source is a surface illuminator that irradiates an entire measurement region being a two-dimensional area of the light-permeable film.

4. The film thickness measuring method according to claim 1, wherein
the obtained film thickness is corrected in accordance with a shape of a surface of the substrate when the surface of the substrate is not a flat surface.

5. A film thickness measuring device comprising:
a light source that is arranged on a substrate and that is configured to irradiate a volatile light-permeable film to be measured with light until an end of evaporation of the volatile light-permeable film;
a light receiving element that is configured to receive reflected light of the volatile light-permeable film in a regular reflection direction;
a storage device that is configured to store a reflected light intensity signal that is a time-series signal of a signal intensity of the reflected light output from the light receiving element until the end of evaporation of the volatile light-permeable film, the reflected light intensity signal indicating a change of the signal intensity;

a controller programmed to:

estimate the signal intensity of the reflected light that is obtained by irradiating the volatile light-permeable film with light from the light source, based on a spectroscopic intensity of the light source, a spectroscopic sensitivity of the light receiving element, and an optical constant of the volatile light-permeable film, and acquire an estimation signal indicating a change of an estimated value of the signal intensity of the reflected light as a film thickness of the volatile light-permeable film changes;

specify a time range where a desired time point exists, based on a number of peaks, which correspond to valleys and mountains in a signal waveform of the reflected light intensity signal, from a base point as a time point of the end of evaporation of the volatile light-permeable film to the desired time point, coordinate a signal waveform of the estimation signal and the signal waveform of the reflected light intensity signal with each other such that a time point when a film thickness is equal to zero in, the signal waveform of the estimation signal and the base point in the signal waveform of the reflected light intensity signal coincide with each other, and specify a film thickness range corresponding to the time range in the signal waveform of the estimation signal, based on the number of peaks in the signal waveform of the estimation signal; and set a film thickness corresponding to that estimated value of the signal intensity of the reflected light which corresponds to a film thickness falling within the film thickness range and coincides with the signal intensity of the reflected light at the desired time point, as a film thickness of the volatile light-permeable film at the desired time point.

* * * * *